Dec. 23, 1924.
G. J. BERCK
1,520,396
PLOW ATTACHMENT
Filed April 26, 1921
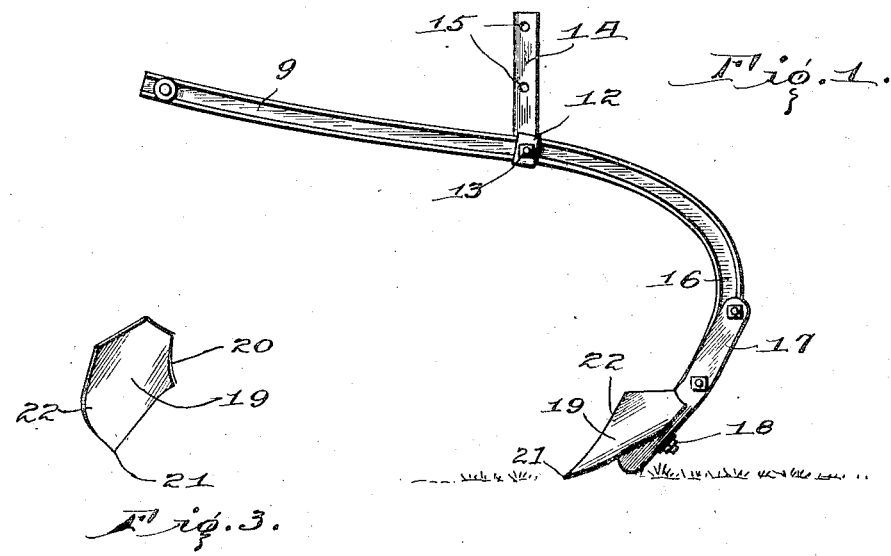
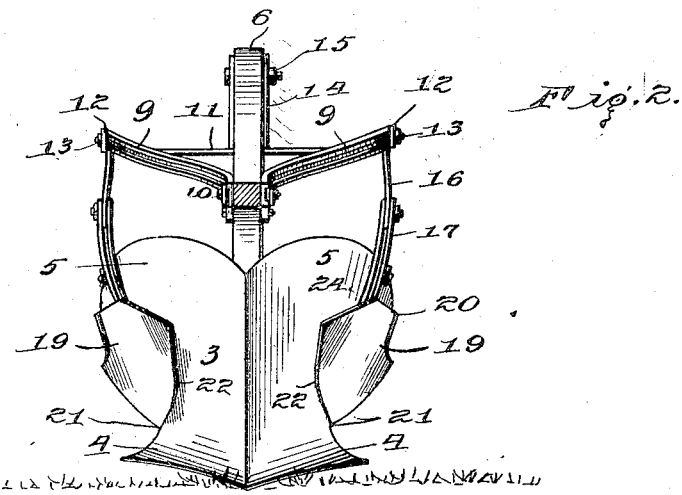
Inventor
Geo. J. Berck.
By Gordon & Stewart
Attorneys Patented Dec. 23, 1924.

1,520,396

UNITED STATES PATENT OFFICE.

GEORGE J. BERCK, OF OSCEOLA, NEBRASKA.

PLOW ATTACHMENT.

Application filed April 26, 1921. Serial No. 464,559.

*To all whom it may concern:*

Be it known that I, GEORGE J. BERCK, a citizen of the United States, residing in Osceola, in the county of Polk and State of Nebraska, have invented certain new and useful Improvements in Plow Attachments, for which the following is a full and complete specification, reference being had to the accompanying drawings.

In using a lister plow it is desirable that the slice be completely inverted and that the grass and other material be turned under the earth. I have found that by providing an auxiliary blade suitably placed with reference to the plow shares of the lister, it is possible to break up the slice as it is lifted and to turn under the slice all weeds, grass and other material. In this manner the furrow is also made somewhat narrower and the earth piled more compactly with the vegetation entirely covered up. It is a further object of my invention to provide adjustable means operating upon the material raised by the plow share and before it has been thrown to the side by the mold board.

Other objects of my invention will be apparent from the following specification and claims, together with the drawings in which latter:

Fig. 1 is a side view of my attachment;

Fig. 2 is a front view showing the same assembled for operation with a lister plow, and Fig. 3 is a plan view of the attachment blade.

As shown in the drawings, this attachment in its preferred form is used in conjunction with a conventional type of lister plow 3, having plow shares 4, 4, and outwardly sloping mold boards 5, 5. The beam 6 of the plow is connected to the plow back of the mold boards by means of supporting members, having connecting means attached to the plow proper. This structure forms part of the customary lister plow.

The attachment forming the subject matter of my invention is shown in its preferred form in Fig. 1. It consists of a frame having two diverging arms 9, 9 which are connected at their forward ends by a cross bolt 10. This cross bolt runs transversely through beam 6 of the plow, as shown in Fig. 2. Connecting the intermediate portions of the arms 9, 9 is a transverse strap 11, the ends of which 12, 12 are bent up at right angles and fastened to the beams 9, 9 by means of bolts 13, 13. An upstanding U-shaped member 14 is suitably attached to the middle portion of the strap 11. The arms of the member 14 are drilled transversely to receive an adjusting bolt 15. By selectively passing the bolt through the arms of the member 14 and through the intervening beam 6, it is possible to vary the elevation of the auxiliary blades with respect to the plow.

The rear ends of the arms 9 are curved downward as indicated at 16 to form attaching means for links 17. These links 17 are suitably bifurcated at their upper ends to permit of their being bolted to the lower ends of arms 9. These links slope inward as indicated at Fig. 2 and terminate in the attaching means for the auxiliary shovels.

By means of bolts 18, passing through the lower portions of the links 17, there is provided fastening means for shovels 19 which are mounted on the forward faces of the links. As will be evident in Fig. 3 each shovel consists of a metal blade having an outer edge 20, the lower end of which has been turned up and provides a curved surface. The lower edge of the shovel tapers to a point 21. The front edge of the shovel terminates in the inner edge 22 which is substantially inclined forward at the top, and runs from the front edge down to the point 21. The curve of the outer edges of the shovel is shown in Fig. 1.

In operation the attachment is mounted with its frame upon the beam of the plow. This brings the two shovels 19 in front of the mold boards and occupying the middle one-third of the vertical dimension of the plow. The arms 9 are rigidly held in position at the desirable elevation with respect to the plow by reason of their attachment to the beam 6.

As the plow share lifts the earth with the sod up and causes it to pass over the mold board, it follows that the shovel will divide the slice and turn the sod from the lower half of the slice before the slice is acted upon by the mold board. Consequently the slice as it is turned over by the mold board will be dropped upon the portion already thrown to one side by the shovel. The inner edge of the blade will engage the standing portions of grass, weeds or other vegetation and fold this material down under the earth conveyed by the mold-board. As a portion of the sod and soil is disposed of by the action of the blade, the resulting slice, which is acted upon by the plow, will be in a sense unsupported and when thrown to one side will tend to fall close to the path of the plow share 4. This insures the minimum distance between adjacent furrows with consequently closer cultivation.

While I have described my invention as illustrated in the preferred form shown in the drawings, many changes in material and details may be made without departing from the spirit of the invention as set forth in the following claim.

What I claim is:

In combination with a plow having symmetrical divergent mold-boards, an arm pivotally connected at its forward end to each side of the plow-beam, a transverse brace between the arms, means medially of the brace to support the arms from the plow-beam in adjustable positions and a supplemental blade carried on the rear end of each arm in front of the mold-boards.

In testimony whereof, I have hereunto affixed my signature.

GEORGE J. BERCK.